(No Model.) 2 Sheets—Sheet 1.
E. H. KRÜGER.
SHINGLE SAWING MACHINE.
No. 587,215. Patented July 27, 1897.
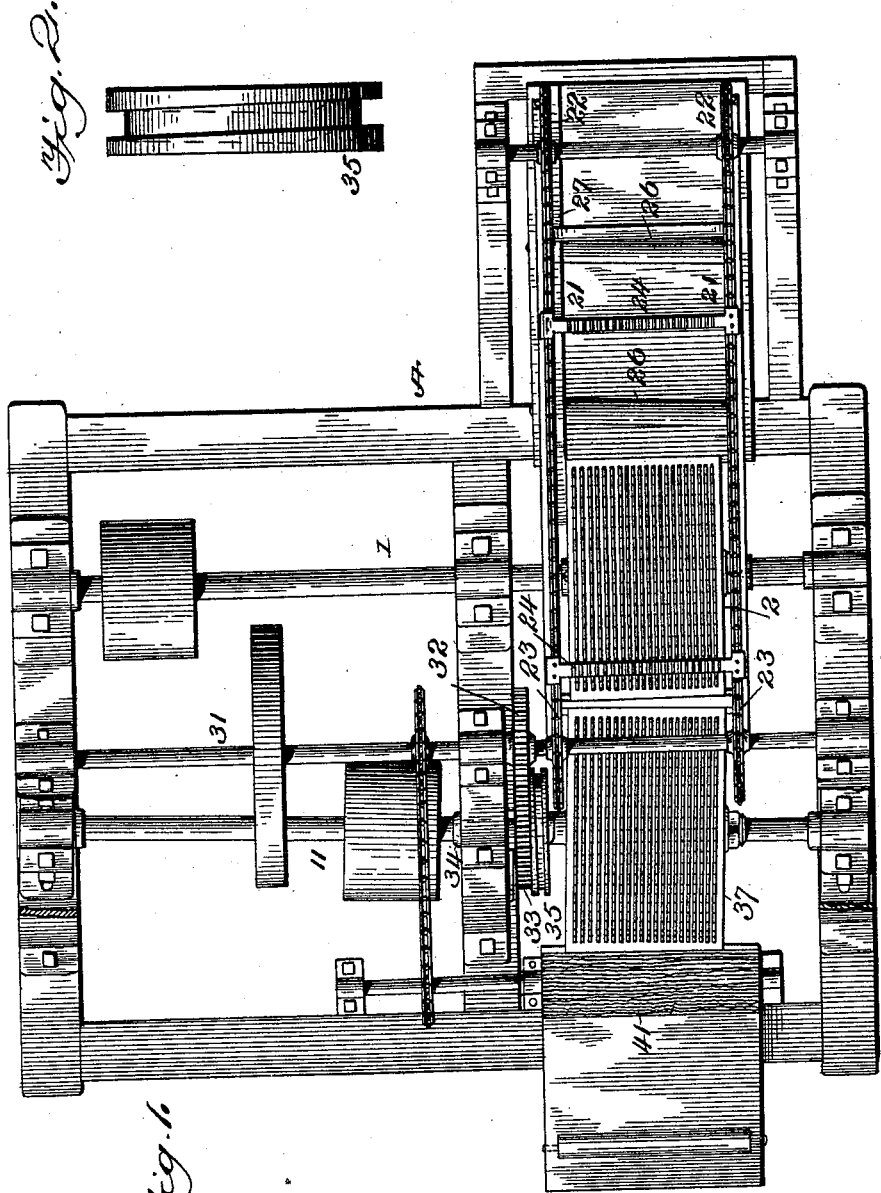

(No Model.)
E. H. KRUGER.
SHINGLE SAWING MACHINE.
No. 587,215.  Patented July 27, 1897.
2 Sheets—Sheet 2.
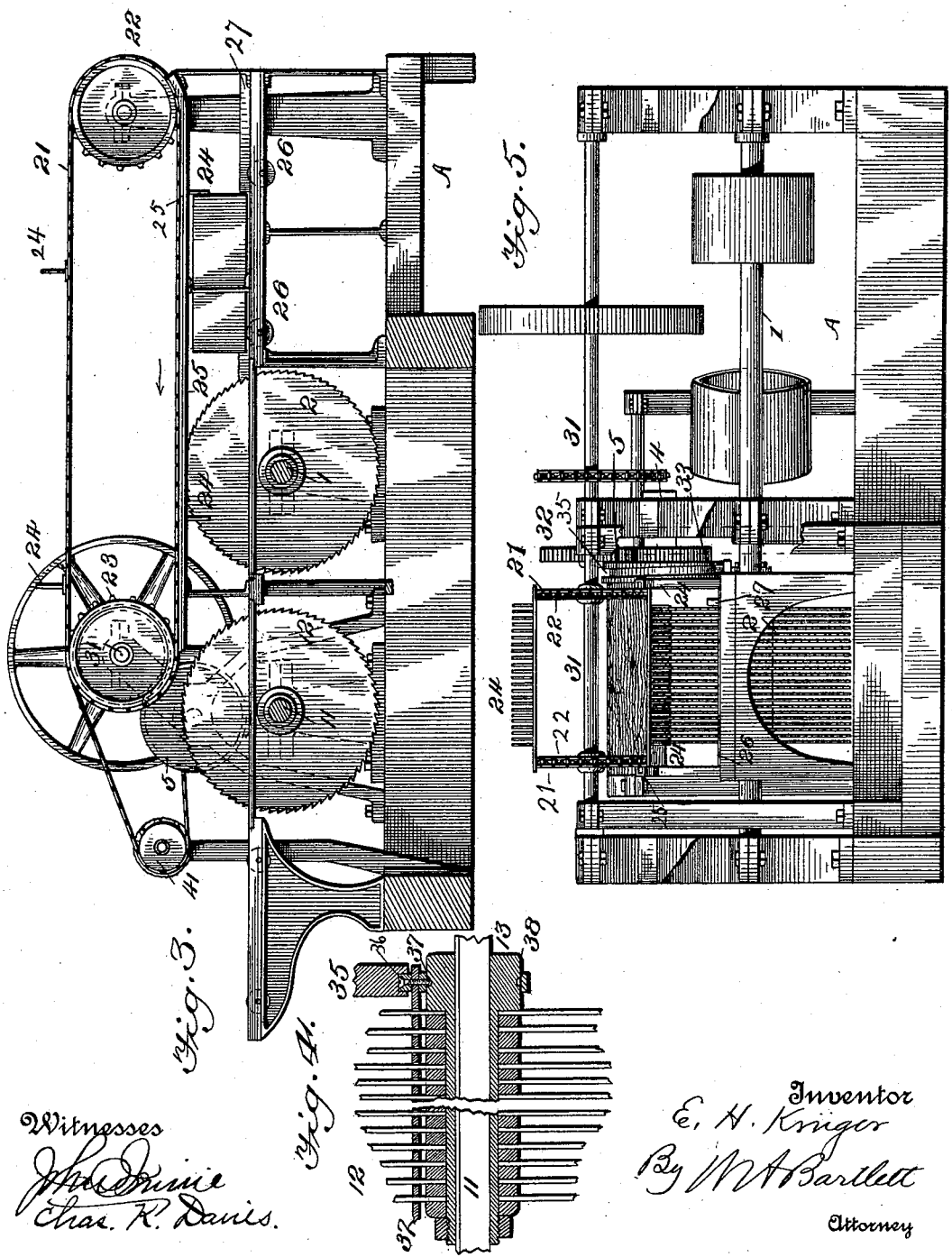
Witnesses
J. H. Irvine
Chas. R. Davis.
Inventor
E. H. Kruger
By W. H. Bartlett
Attorney

UNITED STATES PATENT OFFICE.

EDWARD H. KRÜGER, OF ELIZABETH CITY, NORTH CAROLINA.

SHINGLE-SAWING MACHINE.

SPECIFICATION forming part of Letters Patent No. 587,215, dated July 27, 1897.

Application filed June 10, 1896. Serial No. 594,938. (No model.)

*To all whom it may concern:*

Be it known that I, EDWARD H. KRÜGER, residing at Elizabeth City, in the county of Pasquotank and State of North Carolina, have invented certain new and useful Improvements in Shingle-Sawing Machines, of which the following is a specification, reference being had therein to the accompanying drawings.

This invention relates to machines for sawing shingles.

The object of the invention is to produce a gang circular sawing machine which will saw dimension-shingles from blocks, reducing the entire block to shingles at one operation; also, to produce a feed mechanism which shall certainly feed the blocks or shingles through the machine; also, to provide means for moving one series of saws transversely to the block or shingle during the operation of sawing; also, to improve shingle-machines in various particulars, as hereinafter indicated.

Figure 1 is a plan of the machine, unessential parts not being shown. Fig. 2 is a side or end elevation of a cam for moving the saws. Fig. 3 is a side elevation, partly sectioned, of the essential parts of the machine. Fig. 4 is a broken section lengthwise of the arbor of the movable saws. Fig. 5 is a vertical cross-section looking toward the movable gang of saws.

The general principle of this machine includes a double gang of circular saws. The first gang saws a block into as many parallel-sided pieces as the number of saws or size of block will permit. The fronts of these pieces pass to the second gang of saws before the block leaves the first gang, so that the saws of the first gang serve to a great extent to retain the pieces in proper position. The taper of the shingles is made by moving the second gang of saws transversely while sawing, so that one of the saws entering at one side of the median line of a parallel sided or faced block shall leave the block at the other side, thus producing two tapered shingles, reversed butt and point, from each parallel faced strip.

In the illustration only such parts are illustrated as are necessary to explain the invention, it being understood that frame, belts, feed-board, supply and removing apparatus, and any other adjuncts as may be useful or needful will be employed.

In the drawings, A indicates the frame, which may be of any approved shape and material. Saw-arbors 1 and 11 are supported in suitable bearings in the frame. The arbor 1 bears a gang of saws 2, which need not differ from the usual construction of a gang of circular saws. These saws are set on the arbor and supported by collars or in other suitable manner. The saws on arbor 1 are at such distance apart that they saw from a shingle bolt or block pieces equal to the thickness of two shingles turned head and point, plus a saw-kerf—that is, the blocks sawed by saws 2 will be parallel-faced and contain material enough to make two shingles when sawed obliquely.

Shingle bolts or blocks of uniform size are fed to the gang of saws on arbor 1 by suitable mechanism. That which I have devised and prefer is an endless-chain feeder in which chains 21 21 run over sprocket-wheels 22 and 23, said sprocket-wheels being supported by shafts and driven at the required rate of speed in a manner well known in this art. On the feed-chains are a number of pusher-bars 24, extending from chain to chain and provided with teeth or fingers to extend down behind the end of a block and in position to pass between the saws of each gang without striking the saws, yet so closely as to push a shingle along.

The bars 24 when pushing blocks or shingles toward the saws are supported and guided in ways 25, near the drive-chains. These ways 25 extend lengthwise of the machine and embrace the ends of bars 24 in such manner as to prevent said bars from canting. The fingers on said bars are thus kept in position to bear fairly against the ends of the shingles.

At one side of the saw-table there is a guide strip or ledge, as 27, against which the blocks are alined before reaching the saws 2 of the first gang. To insure this alinement, the table may have feed-rolls, as 26, which are set a little obliquely across the table, or these rollers 26 may be slightly larger at one end than the other, the tendency of which oblique or inclined arrangement of the rollers being to force the blocks against the guide-ledge.

It will be understood by persons skilled in the art that so much of the machine as has now been described when constructed and driven in usual manner would be adopted to saw wooden blocks into pieces with parallel plane faces. In order to make each such piece into two shingles, I arrange the second gang of saws. These saws 12 are supported upon a sleeve 13 and separated by collars. The sleeve 13 is arranged to rotate with arbor 11, but it may move lengthwise on said arbor. By preference I incline arbor 11 very slightly with reference to arbor 1, as is indicated in Fig. 1, so that the saws stand in the line of their cut and inclined to the first cut. These saws 12 are separated by suitable collars and rotate with the sleeve 13, as well as travel transversely of the table with said sleeve.

By reason of the inclination of arbor 11 the saws 12 have a tendency to travel or "creep" transversely of the table whenever a block of wood is fed to them, as will be understood when it is remembered that the block cannot move sidewise and is fed lengthwise of the table. Therefore the block bears against one side as well as the edge of each saw with tendency to press the saw sidewise.

As the blocks or parallel-faced pieces are still between the saws 2 of the first gang and the front end engages the second gang of saws by preference before any of the pieces are sawed entirely from the bolt, I have found by actual use that this tendency of the saws to creep sidewise may generally be depended on to give the proper taper to the shingles if the saw-arbors be set at the proper obliquity; but to avoid all contingencies I have provided a mechanism to force one gang of saws sidewise while sawing the blocks into shingles.

It is obvious that the saws should move sidewise with definite relation to the feed of the block in order to give the proper taper to the shingles. A simple mechanism I have devised to give the proper positive side feed to the saws is shown in the drawings, but other mechanism may be employed.

On the shaft 31, which drives one of the sets of sprocket-wheels and so controls the feed, I apply a pinion 32, which pinion engages a pinion 33 on a counter-shaft 34. Shaft 34 carries an edge-cam 35. A projection 36 on grating 37 enters said cam, and as the cam revolves the grating 37 is moved sidewise. A projection on the lower side of the grating enters a cam-groove in a rib 38, which is rigid with the sleeve 13. Thus the cam 35 serves to drive the grating and saws sidewise as the feed mechanism moves forward.

The cam-wheel 35 has a cam-bearing of such inclination as to shift the saws very slowly sidewise while they are in the wood, but may quickly return them to position to engage the next block.

The grating 37 is a movable section of the saw-table, having bars extending between the saws to prevent the shingles dropping between the saws. These bars are preferably connected to a frame which surrounds the gang on the level of the saw-table.

When the partly-sawed shingles are connected together in the bolt, it is not difficult to control them on the saw-table; but after they are separated it is difficult to retain them in their proper position, with one edge resting on the saw-table and the other perpendicularly above it. The fingers on bars 24 efficiently engage the butts of the shingles, but as alternate shingles have their points toward these fingers the fingers sometimes fail to make proper engagement. As a means for holding the shingles in proper position at the last moment and while the saws are dividing the last uncut portions of the block I provide a drawing feed-roll 41 beyond the second gang of saws. This roll is positively driven by any suitable connection and has an elastic face or engaging points or other means of engagement common in feed-rolls by which the roller adapts itself to engage surfaces which may be slightly unequal. The outside shingles are more likely to be of unequal width than those near the middle of the block, and these outside shingles may be taken away by hand should the pusher-feed and the delivery-roll both fail to press them forward.

Many modifications of details can be made without departing from the spirit of my invention, which is believed to be set forth generically and specifically in the following claims.

Such a modification as the shifting of either set of saws in lieu of the other is contemplated and covered by these claims. As the side shift of a saw for sawing shingles is only about three-eighths of an inch, while cutting about twenty inches the movement is very slight. The set of the saw-teeth affords a clearance even if the arbor be not set at an inclination; but the inclined arrangement of one of the arbors has given best results up to the present time.

What I claim is—

1. In a shingle-sawing machine, a block-feeding mechanism, two gangs of circular saws, one gang immediately succeeding the other so that the second gang may engage the block before it leaves the first, and means for shifting one gang of saws laterally relatively to the other, all combined substantially as described.

2. In a shingle-sawing machine, the combination with the frame or table, of two gangs of circular saws, one gang in advance of the other, one arbor being inclined relatively to the other, and means for shifting one gang of saws laterally, substantially as described.

3. In a shingle-sawing machine, a power-driven feed mechanism, two gangs of circular saws one in advance of the other, and means connected to the feed mechanism and operating on one gang of saws to feed the same laterally while in operation.

4. In a shingle-sawing machine a gang of circular saws having rotary movement but fixed against lateral movement, a second gang in proximity thereto, having both rotary and lateral movement, a chain feed mechanism by which blocks are fed to both saw-gangs, and mechanism driven by said chain feed to shift the laterally-movable gang of saws during the progress of the work, all combined and arranged substantially as described.

5. In a shingle-sawing machine, a plurality of gangs of circular saws operating successively and means for rotating them, means for shifting one of the gangs laterally while in operation, an endless-chain feed mechanism, and fingers connected to said chain in position to pass between the saws of the gangs, all combined substantially as described.

6. In a shingle-sawing machine, the plurality of gangs of circular saws arranged in proximity, the endless-chain feed mechanism, the fingers connected to the feed-chains in position to pass successively between the saws of all the gangs, and the drawing-rolls at the delivery end of the last gang, all combined substantially as described.

7. In a shingle-sawing machine, the combination with the saw-table and feed mechanism, of two gangs of circular saws, one in advance of the other, one gang being on an arbor inclined with reference to the other, and having a lateral movement thereon.

8. In a shingle-sawing machine, a gang of circular saws having lateral movement, that is, movement in the direction of the axis of the arbor, and a grating embracing said saws and moving laterally with them, in combination substantially as described.

9. In a shingle-sawing machine, a gang of saws, a sleeve on which said saws are hung, said sleeve moving lengthwise and carrying the saws laterally, a grating embracing said saws and connected to the sleeve, and power-driven mechanism for shifting said sleeve and grating in the direction of the length of the arbor, all combined substantially as described.

10. In a shingle-sawing machine, the plurality of gangs of circular saws and means for rotating said saws, means for shifting one gang laterally relatively to the other gang, an endless-chain feed mechanism having cross-bars provided with fingers which pass between the saws, and guideways operating on the bars of the feeder, all combined substantially as described.

In testimony whereof I affix my signature in presence of two witnesses.

EDWARD H. KRÜGER.

Witnesses:
W. T. OLD,
CHAS. H. WOOD.